Aug. 13, 1940.   E. D. TILLYER   2,211,086
CONTACT LENS AND METHOD OF MAKING SAME
Filed Dec. 8, 1937
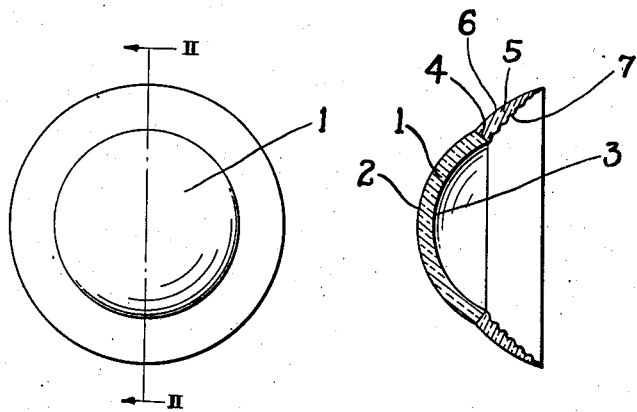
Fig. I   Fig. II
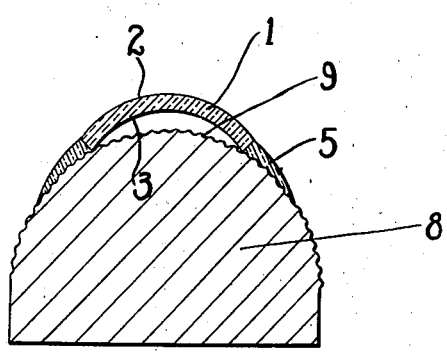
Fig. III
INVENTOR
EDGAR D. TILLYER
BY
Harry H. Still
ATTORNEY Patented Aug. 13, 1940

2,211,086

UNITED STATES PATENT OFFICE 2,211,086

CONTACT LENS AND METHOD OF MAKING SAME

Edgar D. Tillyer, Southbridge, Mass., assignor to American Optical Company, Southbridge, Mass., a voluntary association of Massachusetts Application December 8, 1937, Serial No. 178,754

3 Claims. (Cl. 88—54.5)

This invention relates to improvements in ophthalmic lenses and has particular reference to an improved eye contact lens and method of making the same.

One of the principal objects of the invention is to provide contact lenses and method of making the same which will enable relatively free circulation of the tear solution of the eye and of the blood through the capillary net work of the eye during the use of such lenses.

Another object of the invention is to provide an improved contact lens of the above character which will be non-irritant and yet comfortable during use and has particular reference to the method of making the same.

Another object of the invention is to provide an improved method of shaping the sclera engaging portion of lenses of the above character to the contour of the sclera of the eye before which the lens is to be worn and to simultaneously produce an irregular pitted or pebbled orange peel-like surface which will cause the supporting portion of the lens to fit the general contour shape of the sclera and permit free circulation of the tear solution throughout the eye as well as relatively free flowing of the blood throughout the capillary net work of the eye.

Other objects and advantages of the invention should become apparent from the following description taken in connection with the accompanying drawing and it will be apparent that many changes may be made in the details of construction, arrangement of parts and methods shown and described without departing from the spirit of the invention as expressed in the accompanying claims. I, therefore, do not wish to be limited to the exact details of construction, arrangement of parts and methods shown as the preferred form only has been given by way of illustration.

It has been found from past experience that although eye contact lenses are very desirable from the aesthetical viewpoint much discomfort due to the improper lubrication of the eye and other undesirable characteristics, such as the blocking of the circulation of the blood through the capillary net work of the eye have been in a great part responsible for the restriction in the use of such lenses. The above defects were due primarily to surface contact between the surface of the sclera of the eye and the sclera engaging portion of such lenses. The surface contact in most all instances in the past, due to the resilient nature of the sclera of the eye has been very intimate and thereby prevented proper circulation of the tear solution of the eye and also restricted the blood flow through the capillary net work of the eye. This not only prevented the eye from receiving proper surface lubrication, but also prevented the proper nourishment with the result that such lenses, in many instances, lowered the general physical condition of the eye.

It, therefore, is one of the primary objects of this invention to overcome the above difficulties by providing eye contact lenses which, although comfortable to wear, permits free circulation of the tear solution of the eye and the proper nourishment of the eye through the unrestricted flow of the blood through the capillary net work of the eye.

Referring to the drawing:

Fig. I is a front elevation of the lens embodying the invention;

Fig. II is a sectional view taken as on line II—II of the Fig. I; and

Fig. III is a sectional view illustrating a step in the process or method of manufacture.

Referring more particularly to the drawing wherein like characters of reference designate like parts throughout the several views the lens embodying the invention comprises a piece of lens medium 1, such as glass or other transparent material, having a relatively high melting point and provided with opposed faces 2 and 3, at least one of which, preferably the outer face, has a finished outer surface thereon which, when the lens is in position of use before the eyes, is a factor controlling the resultant optical power of the lens. The main lens portion 1 is secured throughout its peripheral edge 4 to a piece of lens medium 5, such as glass or other vitreous material, having an outer relatively smooth surface 6 thereon and an inner irregular pitted or pebbled orange peel-like surface 7. The lens medium 5 preferably has a low melting point and may be transparent or opaque as desired. In addition to the surface 7 being formed irregular to a pitted or pebbled orange peel-like surface, as stated above, the said surface is so shaped as to fit the irregularities in the contour shape of the sclera of the eye of the individual to which the lens is being fitted.

The surface 7 is so constructed as to permit free flowing of the tear solution of the eye as well as free circulation of the blood through the capillary net work of the eye. The apices of the plurality of irregularities of the surface 7 are smooth and curved and so related with each other as to provide a comfortable fit with the sclera of the eye and yet permit the eye to receive proper lubrication and nourishment.

The surface 7 is preferably formed on the portion 5 by first forming the inner surface of said portion 5 with a polished curvature. The composite structure is then placed on a suitable block 8 having a surface 9 thereon shaped to the general contour shape of the sclera of the eye of the individual for whom the lens is being designed and also having an irregular pitted or pebbled orange peel-like surface thereon. The lens is properly located on the surface 9 and the said block and lens is subjected to heat of a temperature sufficient to soften the inner surface of the portion 5 and permit the said surface to drop to the shape of the immediate associated area of the surface 9 on the block. Due to the fact that the portion 1 is formed of lens medium having a relatively high melting point and that the temperature is so controlled during the shaping of the surface 7 to avoid softening of said portion 1, the said surfaces of said portion 1 will not become altered or distorted during the above mentioned heating operation.

It is to be understood that the lens has to be carefully positioned on the block with the portion 5 located in a position simulating the prescriptive position at which the lens will be supported in contact with the eye.

It is also to be understood that the texture of the surface 7 is such that the said surface will not irritate the sclera of the eye and cause discomfort. This is brought about by placing the various irregularities of said surface in close relation with each other so that although the said surface will permit relatively free flowing of the tear solution of the eye, it will also have a relatively close and comfortable fit with the eye.

Although the irregularities of the surface 7 may be formed as stated above, it is to be understood that a multitude of small rounded projections and depressions, sufficient to enable the blood corpuscles to flow through the blood channels of the eye, can be obtained by a wet polish with a soft polisher on a coarse ground surface, or by etching a ground surface, or by forming a polished surface, spraying said surface with droplets of resist and then etching said surface with a suitable acid, such as hydrofluoric acid or other known acids which will etch glass.

It is also possible, instead of forming the portion 5 of low melting glass or lens medium, to form the said portion of glass or lens medium having the same melting point as the portion 1 and apply a flame only at the edge of the lens while rotating the lens or flame so as to soften only said portion 5. After the portion 5 is dropped to the shape of the surface 9, the lens is allowed to cool to retain said shape.

It is to be understood that the index of refraction of the main lens and its surface shapes are controlled in a manner similar to other ophthalmic lenses in the art to enable the obtaining of the best results as to shape, thickness, and power.

From the foregoing description, it will be seen that simple, efficient, and economical means and methods have been provided for obtaining all of the objects and advantages of the invention, particularly that of providing a comfortable eye contact lens which will not only permit free flowing of the tear solution and proper lubrication of the eye, but will also allow free circulation of the blood through the capillarly network of the eye and thereby avoid any danger of physical injury to the eye.

Having described my invention I claim:

1. A contact lens comprising a corneal portion of relatively hard vitreous material and a scleral portion of vitreous material shaped to rest on the sclera of an eye to hold the corneal lens portion in position before the cornea, said scleral portion substantially, throughout its inner area, having its contacting surface formed with a pebbled orange peel-like surface which embodies a plurality of closely related projections and depressions so grouped that the apices thereof will be shaped substantially to the sclera of the eye, so that one of said projections will not exert a greater pressure than another of said projections on said scleral portion whereby a substantially equal surface pressure contact with the eye will result through the engagement of said projections with said scleral portion.

2. A contact lens comprising a main lens portion of transparent vitreous material and a scleral portion of vitreous material shaped to rest on the sclera of an eye to hold the main lens portion in position before the cornea of the eye, said scleral portion having a pebbled orange peel-like surface covering substantially the entire inner area thereof and being shaped substantially to the scleral shape of the eye so that the irregularities of said orange peel-like surface will exert substantially an equal pressure on said scleral portion of the eye during use.

3. A contact lens comprising a main lens portion of relatively hard vitreous material and a scleral portion of vitreous material having a lower melting point than the vitreous material of said main lens portion joined in edge to edge relation with said main lens portion, said scleral portion being shaped substantially to the contour shape of the sclera of the eye with which it is to be used and having a pebbled orange peel-like surface extending substantially throughout the inner area thereof with the apices of the projecting portions of said surface lying substantially in the plane of the sclera of the eye so that said projections will exert a substantially equal pressure on said scleral portion during the use of the lens.

EDGAR D. TILLYER.